Oct. 23, 1962 R. BIRMANN 3,059,415
TURBOCHARGER FOR INTERNAL COMBUSTION ENGINES
Filed July 8, 1959 6 Sheets-Sheet 1

INVENTOR.
RUDOLPH BIRMANN
BY
Busser, Smith & Harding
ATTORNEYS

INVENTOR.
RUDOLPH BIRMANN

Oct. 23, 1962 R. BIRMANN 3,059,415
TURBOCHARGER FOR INTERNAL COMBUSTION ENGINES
Filed July 8, 1959 6 Sheets-Sheet 4

INVENTOR.
RUDOLPH BIRMANN
BY
ATTORNEYS

3,059,415
TURBOCHARGER FOR INTERNAL COMBUSTION ENGINES
Rudolph Birmann, Highland Farms, Newtown, Pa.
Filed July 8, 1959, Ser. No. 825,773
10 Claims. (Cl. 60—13)

This invention relates to turbochargers for internal combustion engines and to impeller and turbine constructions particularly adapted for such use though more generally applicable to other uses.

Many proposals have heretofore been made to effect turbocharging of reciprocating internal combustion engines and such turbocharging has been successful where the range demands of engine speed and power output have not been excessive. Various problems arise in turbocharging among which may be particularly cited the following:

(1) If an internal combustion engine is associated with a turbocharger the compressor of which is designed for optimum operation at a given engine speed, the usable operating range of engine speed is very narrow: at low engine speeds, if the turbine is so adjusted that it operates at high r.p.m., the operation of the compressor of the turbocharger unit will be in the unstable range of compressor operation, while at higher speeds of the engine the speed of the turbocharger is likely to be too high for the pressure ratio and/or the compressor efficiency will be too low. Various, but generally inefficient devices have been provided in an attempt to overcome these drawbacks.

(2) With decreasing engine load the turbocharger speed decreases very rapidly.

(3) Conventional compressor characteristics make it impossible to maintain, over any substantial range of engine speed, even approximately constant brake mean effective pressure (constant torque) and, a fortiori, even approximately constant brake horse power (requiring a rising torque characteristic with decreasing engine speed).

Most troublesome is the characteristic (2) above. With the engine operating at light load, the turbocharger speed is invariably low. If the engine load is then suddenly increased more fuel must be burned, which can only be done if the turbocharger supplies more air to the engine. It cannot supply more air, however, unless it is first accelerated by the turbine's receiving an increased flow of exhaust gases, which in turn necessitates the engine's receiving more air to be able to burn more fuel. The result is a very slow response of the engine to a demand for more load. In power plants in which the engine continues to operate at full speed even under no load conditions, the no load speed of the turbine may typically be about 10% of full speed. The response is particularly slow if the reduction of load is associated with a reduction of engine speed as is the case with turbocharged engines powering vehicles or used for marine propulsion, in such case the no load speed of the turbine being as low as 2% to 4% of full speed. The response is slower in spark ignition engines than it is in diesel engines, because spark ignition engines have very little latitude in their air-fuel ratios. Diesel engines sometimes can limp along because they can operate with a wide range of air-fuel ratios. When a sudden demand for increased load occurs the air-fuel ratio is momentarily reduced. This increases the preturbine temperature, and therefore also the preturbine pressure, thus making more energy available to the turbine, enabling it to speed up. Nevertheless, this speeding up of the turbocharger takes time because of the rotor inertia, and the response is still slow. Consequently, in almost all turbocharged diesel engines a sudden increase of engine load or speed is associated with heavy smoking, because during the beginning of the acceleration period of the turbocharger it cannot furnish a sufficient amount of air to burn the fuel completely.

In spark ignition engines, because they do not have the benefit of latitude in the air-fuel ratio, the response is particularly poor. In fact, it has been felt by engineers that it would not be practical to turbocharge automobile engines of the spark ignition type. Besides the lag in speeding up, turbocharged internal combustion engines have heretofore been unable to develop high torque at low engine speeds or even constant torque over any reasonable range of speed. The situation is such that it does not help to control the turbine by the use of adjustable turbine nozzles nor even by the use of a highly inefficient and only partially effective waste gate control, which necessarily involves waste of the exhaust gases so that the turbine of the turbocharger is at best utilizing only a fraction of the generally available energy of the gases.

It will be evident that the problem involved is particularly acute in turbocharging spark ignition engines for the drive of motor vehicles where quick response to load demands is essential. In the following disclosure, therefore, consideration will be particularly given to the turbocharging of such engines for motor vehicle drive. It will be understood, however, that the problems stated are quite general though less serious in other types of power plants, and the inventions hereafter referred to are, therefore, of broad applicability for improvement of the turbocharging of internal combustion engines in general.

The first and most general object of the invention is to secure proper operation of a turbocharger-engine power plant with avoidance of the difficulties just mentioned. In particular, the object of the invention is to effect turbocharging of conventional engines. The inventions, however, are applicable to special engines as well.

In brief, the object above set forth is attained by control of the whirl (the vortex strength) of air entering the compressor impeller of a turbocharger so that the turbocharger will operate at all times in a range of speed upwards of about 1/3 of full speed. During engine idling conditions of a four-cycle engine, which has no substantial valve overlap, the compressor may be operated as a turbine utilizing the pressure drop between atmospheric pressure and the sub-atmospheric pressure in the intake manifold of the engine; or, if not required to operate to impart energy to the turbocompressor shaft the compressor may operate at a zero or quite low pressure ratio so that the energy of the exhaust gases may be required to overcome only frictional losses to maintain adequately high turbocharger speed. As a result of this substantially higher operating speed of the turbocharger, as contrasted with no load speeds of conventional turbochargers, the turbocharger is at all times ready to change very rapidly its operating characteristics without a large change of its speed thereby to supply the air demand corresponding to a quick load demand. By providing a decrease in the positive whirl component (i.e. in the direction of rotation) of air approaching the compressor simultaneously with the introduction of additional fuel by conventional carburetor or fuel injection system adjustment, the interactions of the turbocharger and engine change with great rapidity, the compressor providing an increasing pressure ratio, starting with a negative pressure ratio (corresponding to the operation of the compressor as an air turbine) or with a low positive pressure ratio, while the engine immediately supplies more driving energy for the turbine in the form of exhaust gases. In this transition of operation the turbocharger speed needs to change only relatively little, so that inertial lag is so minimized as not to be of material consequence.

The large range of variation of whirl imparted to the air entering the compressor, however, is not consistent with the characteristics of present compressors, giving rise to problems of securing proper entrance flow into the impeller blading. Conventional impeller blading has only a low range of tolerance for deviations of the angle of approach of the air flow relative to the blading from the inlet angle of the blading. It has been known that pressure ratio control may be achieved by adjusting inlet flow guide vanes to vary the vortex strength at the impeller inlet. This has been utilized in connection with superchargers for aircraft in which a compressor is driven at a fixed gear ratio from the engine with the object of maintaining constant compressor discharge pressure despite changes of the ambient atmospheric pressure with altitude. But the range of the whirl component of the incoming air has been quite limited in that the flow angle relative to the impeller of the entering air may not deviate by more than plus or minus 15° from the blade inlet angle. Beyond this angular deviation range violent disturbances of flow occur, in the nature of either "shock" or "choking." Conventional impellers cannot be used in a turbocharger compressor consistently with attainment of the full advantages of the present invention as outlined above in view of the very large range of variation of the whirl component of the inlet air flow which is required, and it is therefore a further object of the present invention to provide an improved impeller tolerating very large divergences of the flow angle relative to the impeller from the inlet angle of the blades. As will become evident, this aspect of the invention is of more general applicability than to the turbocharger-engine power plant herein described.

In the turbocharger-engine power plant provided in accordance with the foregoing, turbine inlet angles must exceed 90° consistently with operation of the engine to develop a high torque at low speed, and the inlet angles are required to be even larger under conditions of engine idling. If the inlet angles are not sufficiently large and if the turbine reaction is not sufficiently high, the turbine will act as a brake under certain idling conditions when the impeller of the turbocharger is effectively acting as a turbine, and the desired high turbocharger speed would not then be maintained. It is, therefore, a further object of the invention to provide an improved centripetal turbine which has characteristics particularly suitable for use in the turbocharger-engine power plant, though, as will appear, turbines provided in accordance with the invention are of more general applicability, the invention relating to aspects of improved turbine efficiency even if the inlet angle conditions indicated above are not primary requirements.

Further objects of the invention relate to improvements in turbocharger construction, certain of these being concerned with a construction in which light materials are used and provision is made for effective heat insulation in a small and compact unit. Still other objects relate to details of impeller and turbine design and construction. Other objects relate to improved bearing and mounting arrangements for the rotor of a turbocharger. Further objects relate to control aspects of a turbocharger provided in accordance with the invention.

The foregoing and other objects particularly relating to details of construction and arrangement of parts will become apparent from the following description, read in conjunction with the accompanying drawings, in which.

Figure 1:
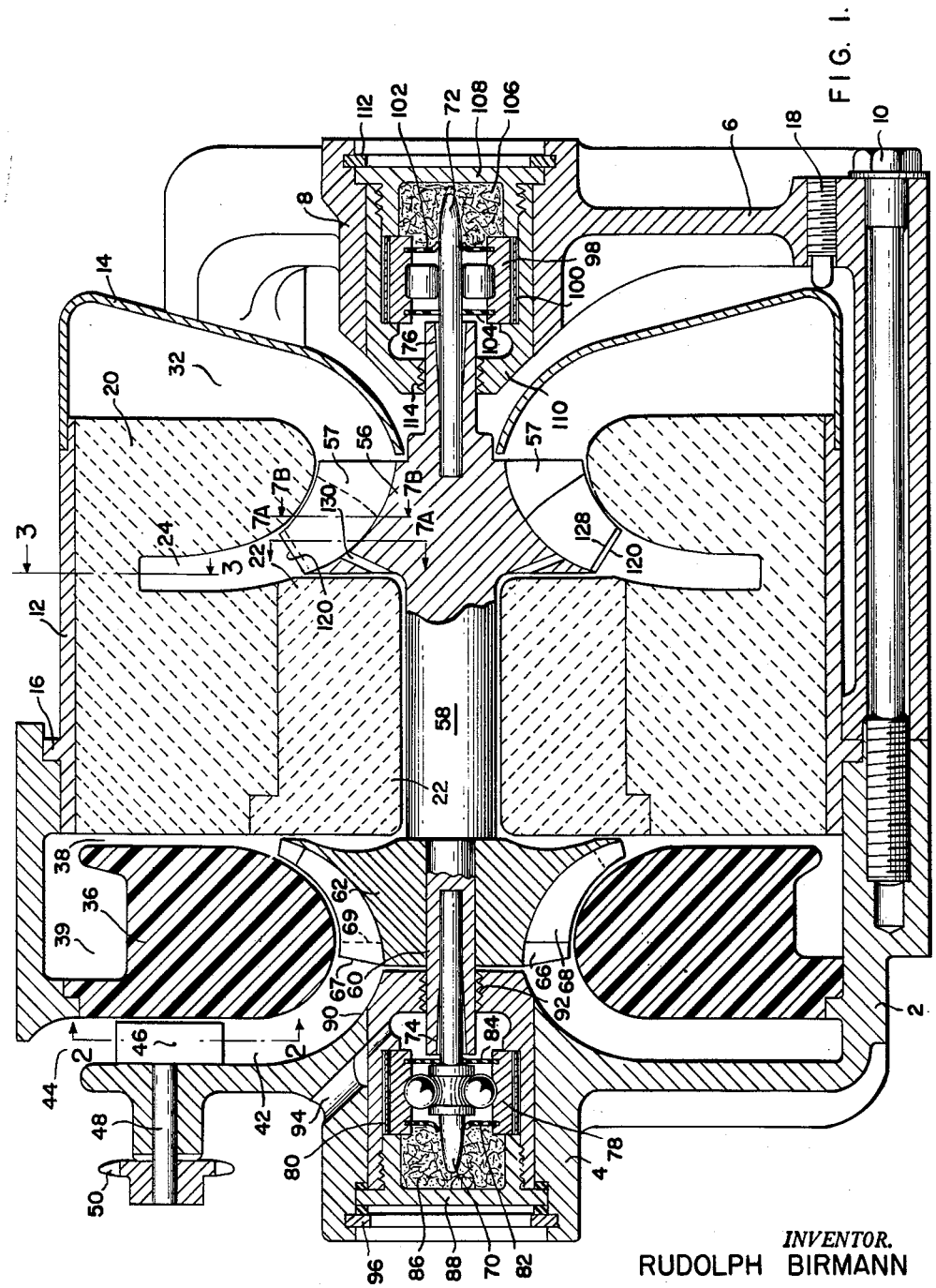
FIGURE 1 is an axial section through a small turbocharger unit particularly designed for the charging of spark ignition engines of automobiles.
Figure 2:
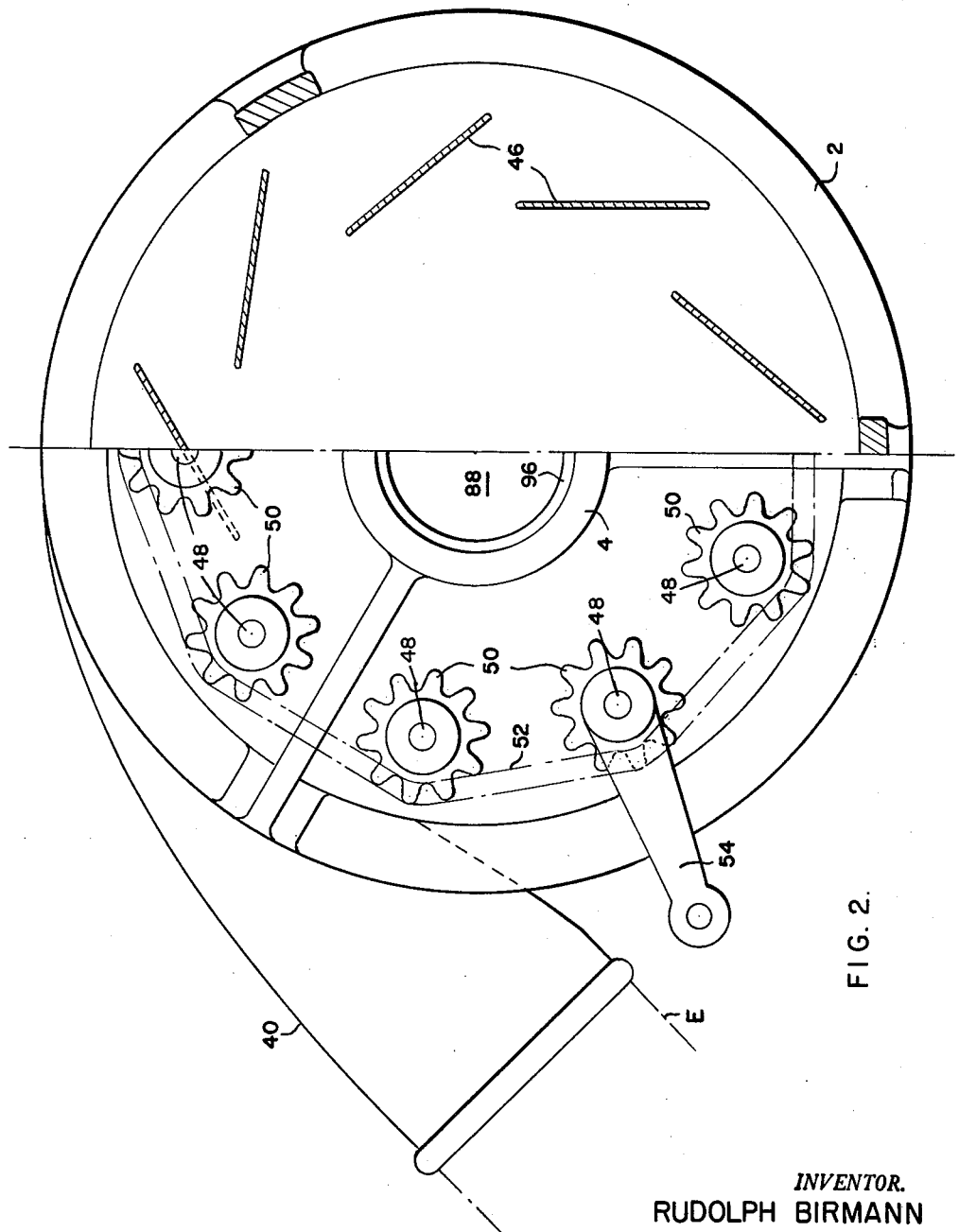
FIGURE 2 is a composite view, the right-hand portion of which is a radial section taken on the plane indicated at 2—2 in FIGURE 1; while the left-hand portion thereof is an end elevation looking at the left-hand end of FIGURE 1.
Figure 3:
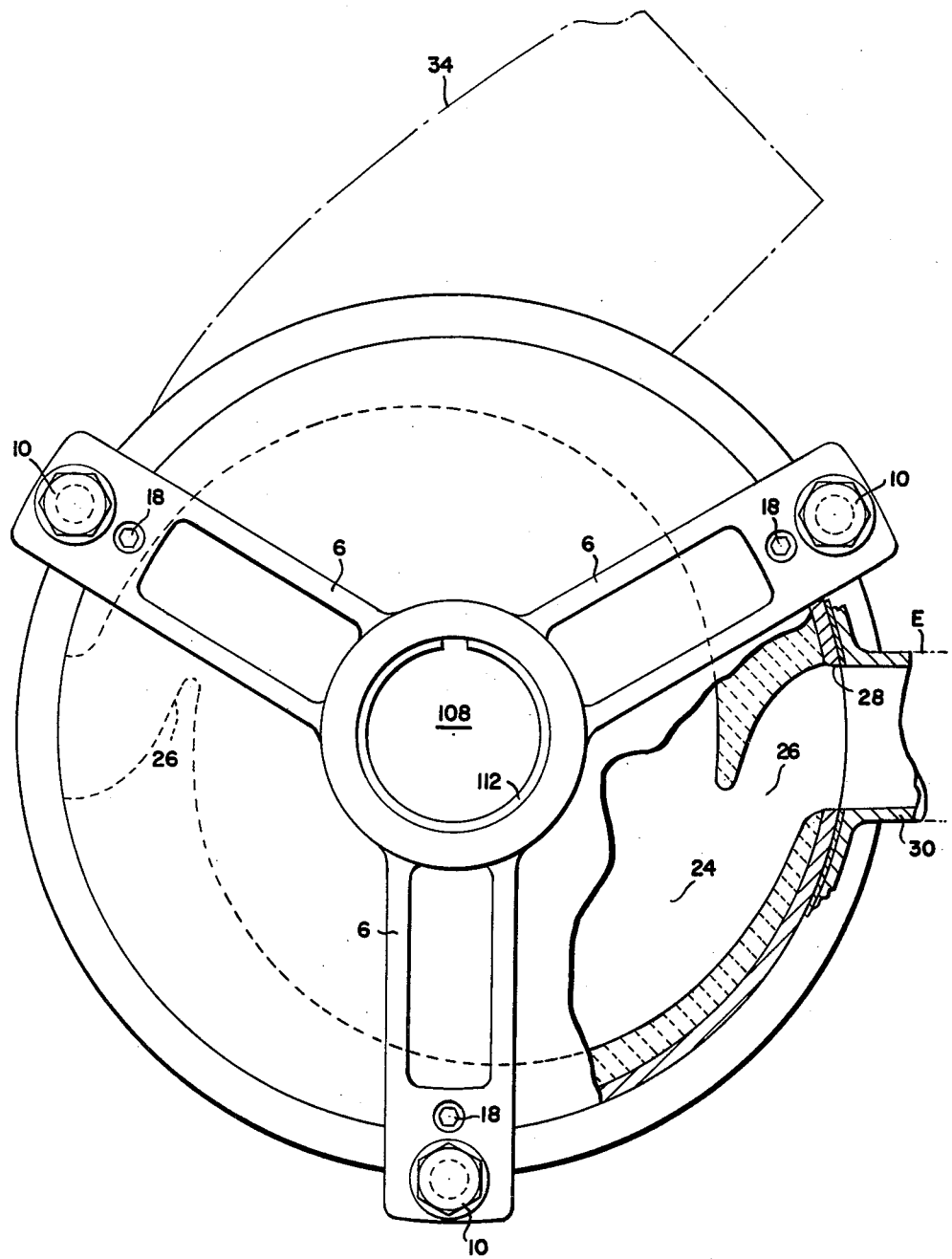
FIGURE 3 is an elevation looking at the right-hand end of FIGURE 1 but with a portion thereof in section on the plane indicated at 3—3 in FIGURE 1.

The general aspects of the turbocharger construction will be first described with particular reference to FIGURES 1, 2 and 3, this being followed by description of the details of the impeller and turbine and of operation.

The rigid, stress-sustaining portion of the housing is formed by two aluminum castings, one of them indicated at 2 and having as part thereof the left-hand bearing housing 4, and the other being indicated at 6 and having formed as part thereof the right-hand bearing housing 8. The part 6 is primarily in the form of a spider which is secured to the part 2 by bolts 10. A sheet metal cylinder 12 has an annular flange 16 clamped between the parts 2 and 6 and supports a sheet metal annular member 14 which is held in position by screws 18. The cylinder 12 is shrunk over the concentric ceramic filler 20 within which is retained (by a retaining pin not shown) ceramic filler 22, the fillers, of refractory material, being separate merely to facilitate assembly. The shrinking of the cylinder 12 on the filler 20 results in placing the filler under compression and the cylinder under tension. The ceramic filler will withstand high compression but no substantial tension, and the arrangement insures tightness despite the large differences in coefficients of thermal expansion of the cylinder and filler, any possibility of tension stresses in the ceramic being eliminated by its prestressing in compression. The filler 20 provides the vaneless vortex space 24 for the feed of driving gases from the engine E to the turbine blading, being formed, as indicated particularly in FIGURE 3, to provide nozzles 26 for directing the driving gases into the space 24 at high velocity in a tangential direction. The cylinder 12 is provided with openings at 28 aligned with the entrances to the nozzles 26, there being arranged to be secured to the cylinder the engine exhaust manifold 30 through which the engine delivers its exhaust gases. Two diametrically opposite nozzles 26 are illustrated particularly suited to a V-engine, but more or only one may be provided if desired depending entirely on the exhaust manifold arrangement or arrangements of the engine with which the turbocharger is associated. The turbocharger is used with multicylinder engine E of either spark ignition or diesel type and consequently the turbine driving gases originate as intermittent pulses from the engine; but by providing a substantial radial region in the space 24 between the nozzles 26 and the inlet edges of the turbine blades, the gases spiral inwardly and vortex flow automatically occurs to minimize pulsations at the turbine inlet edges of the turbine blades.

The filler 20 and the member 14 provide between them the annular vaneless diffuser 32 for the gases exhausted from the turbine. The diffuser provides a radially outward component of flow to the gases and discharges them through a conduit 34 which may carry them to a desired exhaust point.

A filler 36 serves, in part, to delineate the air passages and is secured in the casting 2. This filler 36 is formed of temperature-resistant plastic of any desired type. Plastic may be here used to secure a light weight unit in view of the fact that the air temperatures will not exceed 375° F. and in view of the very effective insulation from the turbine afforded by the ceramic fillers 20 and 22. The filler 36 together with the adjacent surfaces of the ceramic fillers provides the radially extending vaneless diffuser 38 from which the compressed air is discharged into the volute 39 from which it is delivered through connection 40, ultimately to the intake manifold passages of the engine E. This vaneless diffuser desirably has a ratio of exit diameter (at its point of discharge into volute 39) to inlet diameter (at the periphery of discharge of air from the impeller) which is at least 2.0.

Between the casting 2 and the insert or filler 36 there is provided the vortex flow passage 42 for the air approaching the impeller, the flow being radially inward from the annular entrance 44, open to the atmosphere or air cleaner, and being diverted axially for entrance into the impeller blading. Vanes 46 are located in the passage 42 and are angularly adjustable to impart whirl to the entering air. These vanes are carried by individual shafts 48 journalled in the casting 2 and provided at their outer ends with individual sprockets 50 over which there is trained a chain 52 for their simultaneous rotary adjustment. One of them is provided with an arm 54 to which adjusting connections may be made as described later.

The turbine rotor 56 carries the turbine blades 57 which will be hereafter described in detail. The rotor is integrally formed with a shaft 58 provided with an extension 60 at its left-hand end which carries the hub 62 of the impeller. As will more fully appear hereafter, the impeller blading comprises vanes each of which comprises two sections 66 and 68.

Shaft extensions 70 and 72 are carried in slightly tapered openings 74 and 76, respectively, of the rotor shaft. Each of the tapers flares outwardly from its inner cylindrical end for the purpose later described. The tapers are exaggerated in FIGURE 1 for clarity. The left-hand shaft extension is mounted in a ball bearing assembly 78, the shaft itself providing the inner race for the balls of the bearing. The outer race is elastically mounted by means of a leaf spring element 80 of polygonal shape designed to flex under radial stresses. The ball bearing assembly is sealed by means of the seal 84 and the separator 82. Sealed-in lubricant is provided at 86 within the cap member 88 which, together with a member 90 provides the annular space in which the outer race of the ball bearing is located. Labyrinthine air sealing is provided at 92 with the left-hand portion of the shaft 58. Feed openings for sealing air to the region to the right of the ball bearing are provided at 94. The bearing assembly is held in the housing 4 by means of the snap ring 96.

A generally similar assembly is provided at the turbine end of the shaft, the mounting here being by a roller bearing generally indicated at 98, the inner race of which is provided by the shaft extension 72 while the outer race is elastically mounted by means of the spring 100 of the type referred to in connection with the ball bearing. Seal 104 serves to seal the bearing and lubricant is provided at 106 within the cap 108, there being provided a spacer 102. The cap 108, together with the member 110 serves to provide the annular locating space for the bearing. The assembly is retained within the housing 8 by means of the snap ring 112. Labyrinthine air sealing is provided at 114.

Particularly in the case of automotive uses the bearing arrangement has various advantages. It is a highly stable rotor mounting arrangement with which tilting of the impeller and turbine wheels and therefore gyroscopic effects are minimized. Further, it is a mounting which results in shaft diameters which are small enough to make the use of anti-friction bearings practical. Because of their small diameters the linear speeds of these bearings are low in spite of their high rotative speed which may be of the order of 100,000 r.p.m. The linear speeds are sufficiently low to permit lubrication by the sealed-in lubricant shown. Because of the small diameter of the shaft ends and the radial disposition of the turbine exhaust diffuser, excessive transfer of heat to the bearing at the turbine end is prevented. The rotor, furthermore, can be balanced without necessitating subsequent disassembly and reassembly during its installation in the unit. A variable spring rate of the shaft is provided in combination with the elastic mountings of the outer races of the bearings and this arrangement brings about a self-balancing of the rotor thereby completely eliminating critical speeds or other vibration phenomena and preventing any dynamic augmenting of the bearing loading, the latter being the commonest cause of anti-friction bearing distress. The variable spring rate of the rotor shaft is achieved by the pressing of the separate shaft ends into the very slightly curved and tapered bores in the main shaft so that the outermost contact point between the bore and each shaft will shift outwardly with increasing shaft deflection. The result is that the effective spring rate of the shaft becomes stiffer with deflection at a rate exceeding a linear rate as is desirable for restraint of rotor displacements. The taper is very slight. At its inner end, to provide a press fit, the diameter of the bore may be, for example, 0.001 inch less than the diameter of the shaft extension or end, while at its outermost end the bore diameter exceeds slightly that of the shaft extension, for example, by 0.001 inch.

Figure 4:
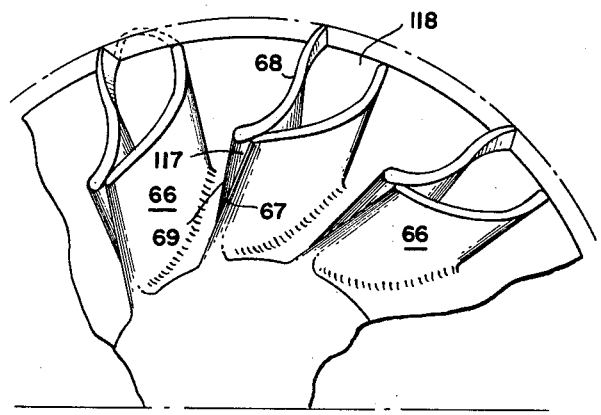
FIGURE 4 is an elevation looking at the inlet side of the impeller shown in FIGURE 1.
Figure 5:
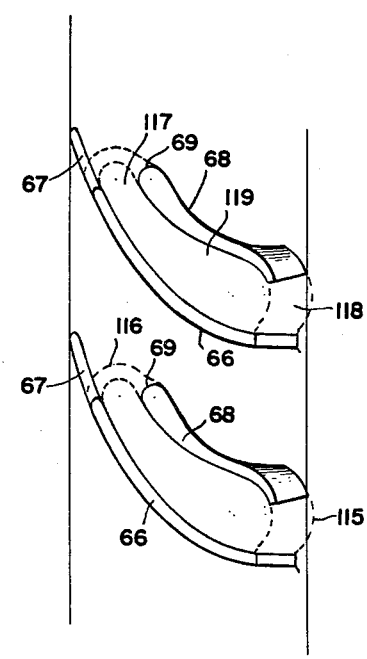
FIGURE 5 is a fragmentary view showing a development of a projection of the impeller on a cylinder coaxial therewith.

Reference may now be made to the improved impeller construction which is particularly illustrated in FIGURES 1, 4 and 5. As has been indicated, in the type of turbocharger arrangement herein considered the incoming air has a quite large range of whirl imparted thereto with the result that deviations of the angle of flow relative to the impeller from the inlet angles of the impeller blades greatly exceed the variations permitted by the use of conventional blade construction. The range of inlet vortex strength at the inlet, namely the product of the peripheral component of the absolute velocity of the entering air at any radius by the peripheral velocity of the inlet edge of the impeller at the same radius, may vary from a negative value to a positive value which, in some cases, may exceed the value of the vortex strength at the impeller outlet. Vortex flow is set up in the radially extending vaneless passage 42 by the guide vanes so that the vortex strength at any radius of the inlet edge of the impeller blading is constant.

In order to provide smooth flow despite the variations indicated above, recourse is had, in accordance with the present invention, to provide for deviation of flow by means of boundary layer energization so as to set up smooth flow between the impeller blades throughout the passage of air from the entrance to the discharge of the impeller. In order to effect boundary layer energization it is necessary to have available either a pressure source or sink to provide deviation of flow. In accordance with the present invention advantage is taken of the fact that a pressure sink is available in a centrifugal impeller at the location of the trailing side of an impeller blade. Design of the impeller blades proceeds as follows:

The inlet flow established at the entrance to the impeller, by virtue of the presence of spin-producing guide vanes 46 and the considerable radial extent of the passage 42 is free vortex flow that is flow characterized by a constant value of the product of the peripheral component of the absolute velocity by the radius from the axis of rotation. At the same time there is highly curved flow adjacent to the impeller inlet in the meridional direction involving a high meridional component of flow velocity at the outside of the inlet eye and a relatively low meridional component of flow velocity near the impeller hub.

Assuming a start of design involving thin impeller blades and designing for some chosen operating condition at which optimum efficiency is desired, the first consideration for design of the thin impeller blades is that of distribution of the inlet angles along the inlet edges to take the foregoing into account, and, if the radii of curvature of the approach passage is small, this requires that the blade inlet angle at the tip be larger than the blade inlet angle at the hub. (The opposite is true in conventional impellers having, generally, blade elements which are radial throughout giving rise to helicoidal blade surfaces, with the inlet edges lying in a radial plane.) Using desirable helicoidal blades, having all elements radial, the inlet angle distribution problem is solved by extending the inlet edge portions of the blades as shown at 67 so that the inlet edges lie on a cone about the axis of rotation rather than in a radial plane. Axial sections of the approach flow passage are curved so that the radii of curvature of the outer and inner boundary walls of such sections have their centers lying on such cone. Then the blade inlet edges are orthogonal to the approach passage walls providing for high efficiency.

Summarizing the foregoing, there are thus provided for a chosen operating condition, thin helicoidal blades which, due to the conical location of their inlet edges, have the proper distribution of inlet angles along these edges, with boundaries of the approach flow passage to which these edges are orthogonal. Actual thin blades, however, do not tolerate the considerable variations of vortex strength herein contemplated, providing good efficiency only in a narrow range of vortex strength.

Assuming that a thin blade of this type is designed it may be considered the center surface of a thick blade built up by the addition of material on both sides of this surface, the thickness being built up so that the maximum thickness is desirably not less than 10% and not more than 35% of the blade pitch measured at the same distance from the impeller axis. The maximum thickness should be located slightly downstream of the midpoint of the blade.

Next it may be considered that the thick blade thus provided is rounded at both its inlet and outlet edges to provide smooth airflow fairing. The result then would be a solid blade which, referring to FIGURE 5, would have a rounded inlet end as indicated by the dotted line at 116 and a rounded exit edge as indicated by the dotted line at 115. Between these rounded edges the surface of this hypothetical blade would on its concave side be the concave side of blade portion 68 and the convex side of blade portion 66.

Next, consider that this thick blade is made hollow, by removal of central material to provide a shell-like blade which has wall thicknesses corresponding to 66 and 68 in FIGURE 5. The next step in the design is to provide the openings at 117 and 118 as shown in FIGURES 4 and 5. The opening 117 is so provided that the respective blade sections 66 and 68 of a single vane or blade terminate at their inlet edges 67 and 69 in such fashion that these edges at any radius terminate at a surface which is approximately normal to the air flow passage at the inlet. The result, as will be evident, is that the inlet edge 69 of the leading blade portion 68 will lie axially beyond the inlet edge 67 of the blade section 66 in the direction of air flow. It should be noted that the inlet edge 67, previously discussed, lies in a cone about the axis of rotation and is orthogonal to the flow, while the inlet edge 69 of blade section 68 is radial (or more nearly radial), being also orthogonal to the flow reaching it. A generally similar situation is provided at the outlet opening 118, so that the outlet edge of the blade portion 66 terminates short of the outlet edge of the blade portion 68 in the direction of air flow, the termination of the former being, therefore, at a radius from the axis of rotation less than the radius of the latter. The result is that each impeller blade has a passage within its boundary sections 66 and 68 which has an entrance at 117 and an exit at 118. It may be here noted that the flow of air relative to the impeller between the blade sections 66 and 68 of a single blade has an S configuration, while that between adjacent blades has only a single curvature.

The result of this construction is that, due to centrifugal action, a pressure sink exists at 119 producing a forced flow through the opening 117 and between the blade sections with discharge at 118. The result is a forced curvature of flow at 117 which enforces, if required, a curvature of flow between the blades so that there is an energized boundary layer produced along the concave side of the blade section 66. It is on this side of this blade section that, during adverse flow angle conditions, there would be separation of flow from the blade. The most adverse condition which would exist is that in which the spin component of the absolute velocity of the entering air would so exceed the peripheral velocity of the impeller that the relative velocity of the flow with respect to the blades might be more or less at right angles to the blades so that something of the order of a right angle turn of the flow would be required to permit the flow to enter smoothly the impeller passage between the blades. This condition may exist during such operating conditions as involve imparting a high whirl component to the air in the direction of rotation to cause the impeller to act as a turbine contributing to the drive of the rotor shaft. By reason of the induced flow of a portion of the air through the passages between the vane sections 66 and 68 of a single blade, despite the adverse angle conditions the flow between the blades is caused to curve so as to flow smoothly between them. Of course, under the normal conditions for which the blades were originally designed the angle relationships are proper, and under such conditions the passages within the individual blades between their sections have no detrimental effect.

Under conditions wherein the impeller is required to operate at times as a turbine some further considerations of design are involved. For a turbine to show good efficiency it must operate with a rather high value of the ratio of peripheral blade speed with respect to the spouting velocity. Since the turbine action of the impeller described is concentrated in the inlet of the blades, the peripheral speed at the inlet must therefore be high to achieve fair turbine performance. This is at variance with the customary design approach for conventional impellers which need not have any turbine action. For these, the peripheral speed at the inlet is usually made as low as possible by using the smallest possible diameter of the inlet annulus to minimize the entrance Mach number and maximize the centrifugal effect to which the air is subjected when passing through the impeller passages. In accordance with the present invention, it is advantageous to design the impeller utilizing an inlet annulus having a relatively large diameter so that the mean square of the inner and outer inlet diameters becomes approximately 55 to 60% of the discharge diameter of the impeller. At the same time, it is desirable that the radial extent of the blade at the inlet should be no more than 30% of the mean inlet diameter.

Considering next the improved turbine design, reference may first be made to some general considerations. The efficiency of centripetal turbines should be theoretically much higher than they have been in practice. Loss coefficients applicable to the flow through the turbine blading have been unusually high. More conservative blade loading, design of blade shapes to secure flow balance, and increase of the degree of reaction to secure highly accelerated flow (known to decrease flow losses) have only been moderately successful in bettering the efficiency. Blade vibration suggests that losses may be due to highly disturbed nature of the flow through the blade passages due to boundary layer phenomena. Without here reviewing the evidence therefor, the conclusion was reached that the losses were largely due to actual flow separation from the leading side of a blade giving rise to a zone of turbulence (stagnant relative to the blade) which restricted the channel through which smooth flow could occur. Further, it appeared that this was due to centrifugal forces acting on the boundary layers which, rotating with the blades, may be viewed as bodies subject to such forces. The boundary layers were thus subject to pressure gradients negative with respect to the direction of flow, and such negative pressure gradients result in rapid growth of boundary layers. The overall phenomena involved rapid recurrence of transients accounting for the noted vibrations.

The adverse pressure gradient within centripetal turbine blade passages is proportional to the square of the change of the circumferential velocity. To suppress the growth of the boundary layers it is necessary to offset the adverse negative pressure gradient caused by centrifugal forces by a positive pressure gradient which is derived from accelerating the relative velocity of flow within the blade passages. To do this the areas orthogonal to the flow should be so adjusted that the relative velocity increases with decreasing radius, and consequently the passage area should decrease in a special pattern in relationship to the change of radius. The cross-sectional passage area should change in accordance with the above so that plotting orthogonal area against a mean line distance of flow the resulting curve should be concave upwardly rather than concave downwardly as at present in conventional centripetal turbines, this being true even if the terminal cross-sectional areas at inlet and outlet were the same for both plots, i.e., the total reactions were the same in both instances. In the case of the old type of blading the heat drop of the driving fluid assigned to expansion in the blading is expended mostly at the discharge, whereas it should be most rapidly expended in the initial portion of the blading.

An attempt to change the cross-sectional area available to flow in accordance with the above by changing the blade tip contour is readily found to be impractical on the basis of stresses which would arise, meridional disturbances, manufacturing difficulties, and the like. An alternative solution is, accordingly, provided in accordance with the invention by making the blades sufficiently thick so that the space which is not desired for flow passages is effectively filled.

Figure 6:
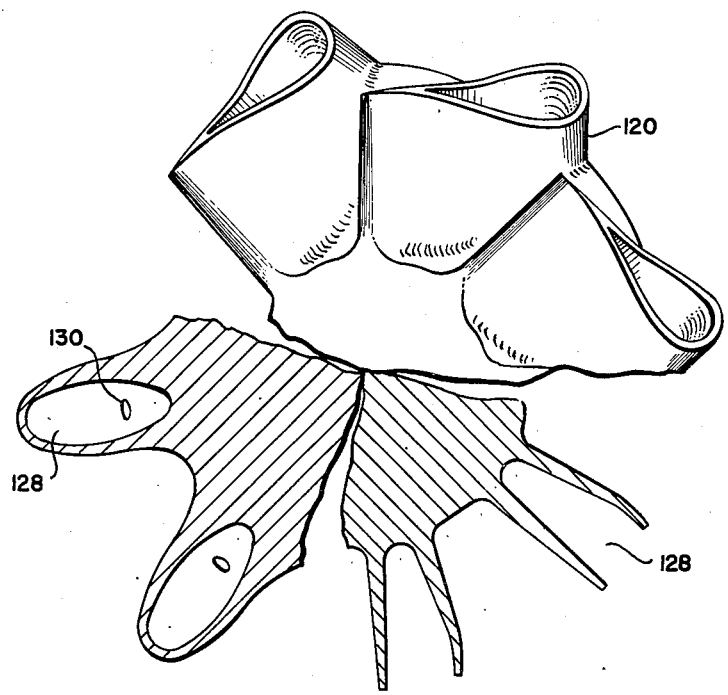
FIGURE 6 is a composite view showing the turbine rotor, the upper portion of this figure being an elevation of the right-hand or discharge side thereof, the lower left hand portion of the figure showing a section taken on the plane indicated at 7A—7A in FIGURE 1, and the lower right-hand portion of the figure showing a section taken on the plane indicated at 7B—7B in FIGURE 1.
Figure 7:
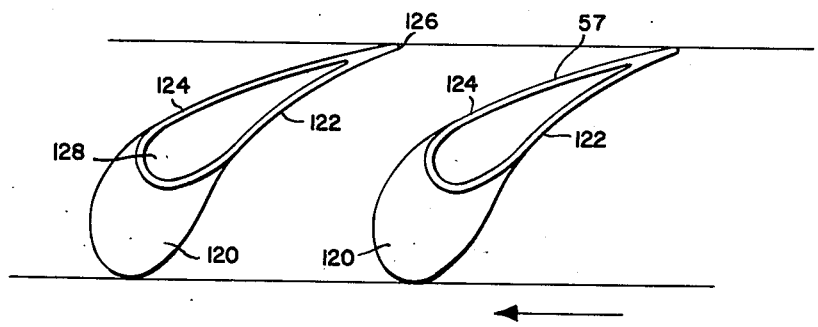
FIGURE 7 is a developed view of the projection of the turbine rotor on a cylinder coaxial therewith.

In accordance with the present invention, a blade construction is utilized which will be clear from consideration of FIGURES 1, 6 and 7. Assuming, to start, given hub and peripheral meridional blade contours and given circumferential projections of inlet and outlet edges, for example, as illustrated in FIGURE 1 (these being chosen in accordance with conventional considerations of the centripetal action desired, aerodynamic loading, etc.), a flow passage may have its mean surface determined in accordance with conventional computations, taking into account in the design a variation of cross-section of the flow passage normal to the flow to provide a velocity distribution in accordance with the foregoing, i.e., involving a pressure gradient due to reaction which at each point exceeds the negative pressure gradient due to centrifugal effects. It will then be found that the passage walls 122 and 124 will be as illustrated particularly in FIGURE 7. If the walls of adjacent passages are then combined to form blades, i.e. the leading wall of one passage with the trailing wall of the next preceding, there is found the fortunate circumstance that the inlet edges are circumferentially thick and by rounding become highly bulbous as indicated at 120, the sides of the resulting blades at 122 and 124 converging to a discharge edge at 126 which may be rounded to provide for a smooth flow pattern. To provide a light construction the interior of each blade thus arrived at may be opened as at 128. It is further found that with negligible departure from theoretical shape the thin walls extending from the portion of the bulbous inlet edge 120 toward the location of discharge may be quite closely radial.

Summarizing the foregoing, a passage is first designed having its cross-section chosen to provide the specified velocity distribution; assuming two such passages adjacent to each other with their exit openings approximating contact, the material between them becomes a theoretical blade; then by rounding the inlet portion of this blade the bulbous entrance edge results, and by slight changes in the passage boundaries the walls may be made approximately radial; finally, removal of interior material results on the final blade shape, the remaining material thickness being chosen to meet centrifugal stress considerations.

The bulbous inlet edges of the blades constitute archlike constructions convex with respect to the axis of rotation, which may be so shaped as to conform with surfaces which involve the metal adjacent to these inlet edges being substantially only in tension and not subject to bending stresses due to centrifugal forces. The open spaces 128 within the blades are desirably in communication with the back of the hub through individual passages 130 to receive air from the compressor about the shaft 58. In the case of turbochargers here particularly considered, cooling is not of great importance; but if a turbine is to be operated at high temperatures special provisions may be made for introducing an adequate flow of compressed air for cooling purposes through the passages 130 into the openings 128, to be discharged either at the periphery or otherwise into the gases flowing through the turbine blading.

The described turbine construction has various advantages, some of which have already been mentioned, as follows:

Owing to the strong acceleration of the flow immediately upon entering the rotating blade passages an excessive rate of boundary layer growth and separation of the flow from the blade surfaces are prevented. As discussed above, this is an action peculiar to centripetal turbines in which the adverse effects of a pressure gradient set up by radially inward flow against centrifugal force must be overcome.

While in ordinary turbine blading moderate aerodynamic lift coefficients are achieved by increasing the number of blades, the securing of moderate lift coefficients in the present instance is secured by reason of the fact that the lift coefficient decreases inversely proportionally to the increase of number of blades but also inversely proportionally to the square of the increase of the velocity of flow relative to the blades. Accordingly, comparing the present construction having, for example, nine blades with another construction of similar dimensions but having eighteen thin blades, the lift coefficient is doubled by using one-half the number of blades, but by reason of the doubling of relative velocity through the blade passages the lift coefficient is reduced by a factor of four. The end result is that the aerodynamic lift coefficient for the nine new thick blades is one-half that for the eighteen old thin blades. This means that the new turbine wheel is much more conservatively designed so far as lift coefficients are concerned.

By providing fewer (but thicker) blades in accordance with the invention, the total friction surface is drastically reduced and, moreover, the Reynolds number applicable to the flow passages is substantially increased. Both of these factors additionally lead to reduction of flow losses and to corresponding improvement in turbine efficiency. While this is true for centripetal turbines of all sizes, the improvement is particularly significant in small turbines where friction losses and other Reynolds number effects constitute such a large percentage of the total losses that in the past it was impossible to achieve acceptable efficiency in small turbines.

Any turbine blade derives its driving force from the pressure difference that exists across the blade. This pressure difference causes a leakage flow between the tip of each blade and the stationary shroud surface. The leakage flow constitutes a serious loss, partially because it reduces the blade driving force and partially because it disturbs the main flow. The new blades involve sealing against such flow by means of the labyrinth effect particularly resulting from the provision of a large expansion space (128) between the two labyrinth throttling points, the outer edges of the blade walls at 122 and 124.

In conventional centripetal turbines the angle of the relative flow entering the blade passages must accurately coincide with the entrance blade angle but this is hardly ever the case, and at best only at one single operating point, because the blades of the conventional centripetal turbine are always very thin exposing an almost sharp edge to the flow, so that even a slight deviation of the relative flow angle from the blade angle results in shock and separation losses. In the case of the novel blading disclosed herein the entrance edges are bulbous. The flow around the inlet edges is very highly accelerated. These two factors combine to prevent flow separation and the losses connected therewith even if the relative flow angle differs greatly from the blade angle. The range, accordingly, over which efficient operation can be maintained is greatly extended so that the new centripetal turbine may handle many problems which cannot be solved with the conventional type of turbine. For example, this is true when the turbine drives a variable pressure ratio turbocharger compressor as in the present disclosure. In such a case the turbine must operate with a $u/c$ ratio both lower and higher than that (for example 0.55) for which it is designed and the reaction and the blade angles chosen to result in optimum efficiency. Lower and higher $u/c$ ratios both give rise in conventional turbines to very poor turbine efficiencies. In the case of lower $u/c$ ratio (0.40 for example) the efficiency drops off because of shock on the trailing side of the blades at their inlets and the blade inlet angle not coinciding with the relative flow angle triggering off complete flow separation which is primarily due to insufficient acceleration on the leading side. At high $u/c$ ratio (1.00, for example) energy dissipating shock occurs on the leading side, separation on the trailing side, and, due to insufficient reaction, the gases are discharged while still retaining a large whirl component, all of which results in a precipitous dropping off of the efficiency. This may even extend into a condition in which braking occurs, this condition arising under engine idling conditions.

During such engine idling operation the energy available to the turbine is a minimum and because of the high $u/c$ the kinetic energy at the outlet of the turbine blades as percentage of this energy available to the turbine is a maximum. Under these conditions, so as to achieve maximum possible output from the turbine, the radial exhaust diffuser 32 becomes of particular importance. It converts the high (percentagewise) kinetic energy at the turbine blade discharge into a pressure rise which results in the expansion within the turbine blade passages to be carried to a lower back pressure (even to a sub-atmospheric pressure) and consequently in the attainment of increased output.

Still another factor which further increases the output of the turbine under conditions of operation with reduced compressor inlet guide vane settings and correspondingly increased $u/c$ of the turbine follows from a situation as follows:

It was found that with increasing $u/c$ a centripetal turbine tends to dam up the flow more and more, very much in the same manner as if the turbine nozzle area were reduced more and more. The increased pressure ahead of the turbine increases the energy made available thereto causing the turbine to deliver more output. This last named factor is particularly important for the achievement of self-sustained operation of the turbocharger at light load of a two-cycle engine for which the turbocharger is the sole source of air supply. Furthermore, it is the main contributing factor which makes possible for the turbocharger as shown by FIGURE 1 to cause the engine to develop a high torque at low engine speed, which cannot be accomplished with a conventional turbocharger.

A turbine having diagonal flow as illustrated is particularly advantageous since by such an arrangement the inlet angle may be chosen to be other than 90° for normal operation consistently with maintenance of radial conditions of the blade elements. (In a turbine wheel receiving radially directed inflow the inlet angle consistent with radial blade conditions can only be 90°.) In the case of thin blades in a diagonal flow wheel the inlet would theoretically be highly twisted in order to result in shockless entrance throughout the entire orthogonal extent of the entrance. The type of turbine herein disclosed avoids all these disturbances. Because of such a high tolerance to a substantial difference between the blade angle and the flow angle, twist of the blading is not necessary so that diagonal flow blading may be used. Furthermore, the tolerance to the difference of flow and blade angles broadens the high efficiency region of the characteristic of efficiency plotted against $u/c$ ratios to avoid the drops of efficiency at the high and low values of this ratio, with particular avoidance of the braking action at high values of this ratio.

Rigidity and the withstanding of centrifugal stresses has been mentioned, the bulbous structure at the inlet providing a very strong design in which the stresses are substantially solely in tension. Tied in with this is also blade rigidity resisting the building up of any vibration patterns. Vibration failure possibility is made vanishingly small by the rigidity of the construction coupled with the prevention of flow separation which, if it occurs, sets up transients serving as a source of vibration.

The blades are further resistant to damage by foreign particles of solid nature carried with the stream. Thin edges of prior blades have been susceptible to such damage. With the present turbine construction particles directed at high velocity by the flow against the blades strike a smoothly rounded surface which is tightly stretched by centrifugal action and are readily carried away by the highly accelerated flow. Similar particles in prior constructions have involved repeated rebounding against the blade tips because flow velocities were insufficient to carry them through the flow passages against centrifugal forces.

Figure 8:
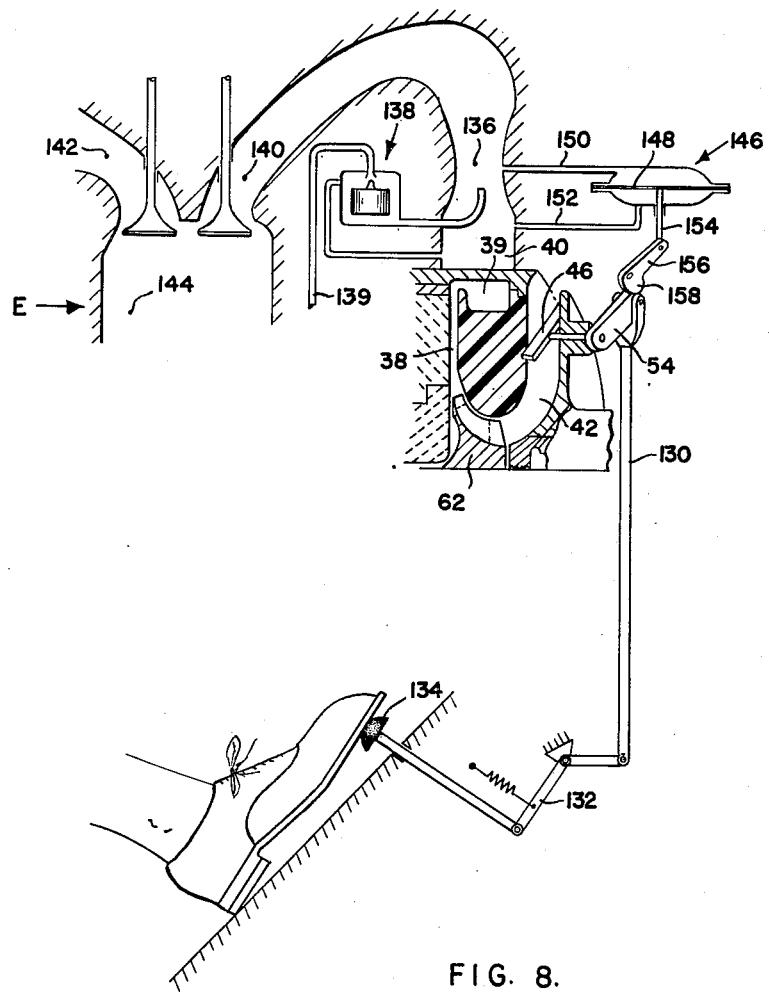
FIGURE 8 is a diagrammatic view illustrating particularly control elements for a turbocharger-engine power plant provided in accordance with the invention.

While from the foregoing description the general aspects of control of a turbocharged power plant will be understood, reference may now be made to a type of control typical of a use in a vehicle. For simplicity it may be assumed that the engine E is of spark ignition type, and the description will be consistent with that assumption. the turbocharger is only partially indicated in FIGURE 8 but it will be understood to be as heretofore described. The arm 54 controlling the vanes 46 is connected through link 130 and bell crank 132 to an accelerator button 134 which may be depressed by the foot of the vehicle driver. As will be noted from the linkage, when the accelerator button is not depressed the vanes 46 will be in the "closed" position, i.e. arranged to give a maximum peripheral component of flow to the incoming air, thus producing a driving component of flow for the impeller which, under these conditions, acts as a turbine to aid in maintaining an acceptable speed of the turbine-compressor rotor. The engine will then be in idling position, its adjustments being such that it will continue to run but under conditions providing subatmospheric pressure in the intake manifold and, therefore, at the compressor outlet represented by the passage 40. Between the compressor outlet passage 40 and the intake manifold of the engine E indicated at 140 is a venturi 136 providing, as part of a carburetor, for the aspiration of fuel from the carburetor chamber conventionalized at 138, the chamber receiving fuel from the fuel pump line 139. The exhaust manifold of the engine E is shown at 142 and a cylinder at 144. The spark ignition means is not shown. For purposes of most satisfactory control there is provided at 146 a control element comprising a diaphragm 148 and chambers above and below the same, the upper chamber being connected at 150 to the throat of the venturi and the lower chamber at 152 to the passage 40. The slidable stem 154 connected to the diaphragm 148 controls a lever 156 which interposes a stop cam 158 in the path of upward movement of the outer end of the arm 54.

Under the idling conditions just described the stop 158 has its major limiting action on movement of arm 54 preventing mechanically more than a partial opening of the vanes 46.

If, now, it is desired to increase the power output of the engine the operator will depress the button 134 moving the vanes 46 toward a more open condition, the movement being limited by the stop cam 158. This movement of the vanes decreases the whirl component of flow approaching the impeller of the compressor with increase of the pressure ratio and of flow of air to the intake manifold. The fuel delivery system delivers more fuel to the engine, increasing its power output. This increases the energy content and quantity of the exhaust gases, thereby increasing the power input to the turbine. As this increased air flow takes place the stop cam 158 is rocked in a direction to permit further opening of the vanes 46. This action is progressive, but may take place in a very short time so that without appreciable delay the engine may be brought, if desired, to full power output and full speed, resulting in full drive of the turbine and development of maximum pressure ratio and consequent air flow by the compressor, the whirl component of the incoming air being reduced to zero or even to a condition where the whirl component is reversed and is opposite to the rotation of the compressor impeller. The purpose of the limiting stop cam 158 is merely that of preventing the compressor from attempting to deliver more air than the engine, during initial phases of its acceleration, is capable of aspirating. When the power output is to be reduced, the accelerator button is released producing a reverse progression of the operations of the system. It may be here noted that the stop cam 158 or its equivalent is needed only for engines operating over a wide range of speeds. At low engine speeds the engine can aspirate only a small amount of air, and if the guide vanes were suddenly opened fully violent pulsation in the compressor would occur, absorbing so much power that the turbine would slow down. The stop limits the guide vane opening to the point where the compressor can deliver maximum flow without pulsation and without excessive power consumption.

It will now be evident how a generally similar system may be applied to a diesel power plant. In such case the carburetor arrangement may be replaced by a fuel injection system controlled by a linkage such as 130, 132, and 134, the connection to the vanes 46 being similar to that described. The stop, typified by cam 158 may, obviously, be controlled in response to engine speed or by some other means depending on the amount of air aspirated by the engine. Of course, in cases of power plants for other than automotive purposes the control arrangements would be those more suitable for the particular power plant and its use involved.

In general, it is desirable to control speed and power output of spark ignition engines by controlling the airflow by means of the compressor inlet guide vanes and letting the amount of fuel be controlled indirectly by any suitable known device (such as a carburetor) which measures the amount of air delivered to the engine and automatically proportions the fuel flow thereto so that the air-fuel ratio is correct and constant. In diesel engines which always operate with a substantial air excess and it is not necessary to maintain the air-fuel ratio constant, the fuel flow can be controlled directly and whatever control motion is used for this purpose can also be made to actuate the compressor inlet guide vanes as long as the tying together of fuel flow control and guide vane positioning is so made that the turbocharger operates at desired sufficiently high speed as described.

It will be evident that various changes may be made in the foregoing matters, and that various aspects of the invention may be used separately, without departing from the invention as defined in the following claims.

What is claimed is:

1. In a turbocharged engine power plant, an internal combustion engine, means for supply fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, means for varying the whirl component of the air approaching the impeller blades to maintain high speed of the turbine-compressor combination at light engine loads, and means for limiting the decrease of said whirl component of the air when the engine is operating at low speed.

2. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, means for varying the whirl component of the air approaching the impeller blades to maintain high operating speed of the turbine-compressor combination throughout a range of engine loads ranging from idling to a full load and throughout a wide range of engine speeds, and means for limiting the decrease of said whirl component of the air when the engine is operating at less than full speed.

3. In a turbocharged engine power plant,
an internal combustion engine,
means for supplying fuel at variable rates to said engine,
a turbine of centripetal type,
a compressor having a rotary bladed impeller driven solely by said turbine throughout a wide range of engine operating conditions,
means for leading exhaust gases from said engine to said turbine to drive the latter,
means for leading air delivered from said compressor to said engine to support combustion of the fuel in the engine,
means for varying the whirl component, in the direction of rotation of said impeller, of the air approaching the impeller blades, and
means for controlling said whirl varying means and supply of fuel to effect concurrent decrease of said whirl component and increase of rate of fuel supply and vice versa,
thereby to maintain high speed of the turbine-compressor combination through said wide range of engine operating conditions.

4. In a turbocharged engine power plant,
an internal combustion engine,
means for supplying fuel at variable rates to said engine,
a turbine of centripetal type,
a compressor having a rotary bladed impeller driven solely by said turbine throughout a wide range of engine operating conditions,
means for leading exhaust gases from said engine to said turbine to drive the latter,
means for leading air delivered from said compressor to said engine to support combustion of the fuel in the engine,
means for varying the whirl component, in the direction of rotation of said impeller, of the air approaching the impeller blades, and
means for controlling said whirl varying means and supply of fuel to effect concurrent decrease of said whirl component and increase of rate of fuel supply and vice versa,
thereby to maintain the high speed of the turbine-compressor combination through said wide range of engine operating conditions, said means for supplying fuel at variable rates being a carburetor in said means for leading air from the compressor to the engine so that control of said whirl varying means, by changing the rate of air flow, controls the rate of fuel supply.

5. In a turbocharged engine power plant, an internal combustion engine, means for supplying fuel at variable rates to said engine, a turbine of centripetal type, a compressor having a rotary bladed impeller driven solely by said turbine throughout a wide range of engine operating conditions, means for leading exhaust gases from said engine to said turbine to drive the latter, means for leading air delivered from said compressor to said engine to support combustion of the fuel in the engine, means for varying the whirl component, in the direction of rotation of said impeller, of the air approaching the impeller blades, and means for controlling said whirl varying means and supply of fuel to effect concurrent decrease of said whirl component and increase of rate of fuel supply and vice versa, thereby to maintain high speed of the turbine-compressor combination through said wide range of engine operating conditions, each of the impeller blades comprising two spaced sections of which the trailing section has an inlet edge projecting beyond the inlet edge of the leading section in a direction opposite the direction of air flow and of which the discharge edge of the leading section projects beyond the discharge edge of the trailing section in the direction of air flow.

6. In a turbocharged engine power plant, an internal combustion engine, means for supplying fuel at variable rates to said engine, a turbine of centripetal type, a compressor having a rotary bladed impeller driven solely by said turbine throughout a wide range of engine operating conditions, means for leading exhaust gases from said engine to said turbine to drive the latter, means for leading air delivered from said compressor to said engine to support combustion of the fuel in the engine, means for varying the whirl component, in the direction of rotation of said impeller, of the air approaching the impeller blades, and means for controlling said whirl varying means and supply of fuel to effect concurrent decrease of said whirl component and increase of rate of fuel supply and vice versa, thereby to maintain high speed of the turbine-compressor combination through said wide range of engine operating conditions, each of the impeller blades comprising two spaced sections of which the trailing section has an inlet edge projecting beyond the inlet edge of the leading section in a direction opposite the direction of air flow.

7. In a turbocharged engine power plant, an internal combustion engine, means for supplying fuel at variable rates to said engine, a turbine of centripetal type, a compressor having a rotary bladed impeller driven solely by said turbine throughout a wide range of engine operating conditions, means for leading exhaust gases from said engine to said turbine to drive the latter, means for leading air delivered from said compressor to said engine to support combustion of the fuel in the engine, means for varying the whirl component, in the direction of rotation of the impeller, of the air approaching the impeller blades, and means for controlling said whirl varying means and supply of fuel to effect concurrent decrease of said whirl component and increase of rate of fuel supply and vice versa, thereby to maintain high speed of the turbine-compressor combination through said wide range of engine operating conditions, said impeller blades being characterized by smooth acceptance of air having widely ranging whirl components by reason of the construction of each blade of two spaced adjacent sections to provide air flow between the sections deflecting air flow between the blades.

8. In a turbocharged engine power plant, an internal combustion engine, means for supplying fuel at variable rates to said engine, a turbine of centripetal type, a compressor having a rotary bladed impeller driven solely by said turbine throughout a wide range of engine operating conditions, means for leading exhaust gases from said engine to said turbine to drive the latter, means for leading air delivered from said compressor to said engine to support combustion of the fuel in the engine, means for varying the whirl component, in the direction of rotation of the impeller, of the air approaching the impeller blades, and means for controlling said whirl varying means and supply of fuel to effect concurrent decrease of said whirl component and increase of rate of fuel supply and vice versa, thereby to maintain high speed of the turbine-compressor combination through said wide range of engine operating conditions, The inlet annulus of the impeller having radial dimensions such that the mean square value of the inner and outer diameters of the annulus is approximately in the range of 55% to 60% of the discharge diameter of the impeller.

9. In a turbocharged engine power plant, an internal combustion engine, means for supplying fuel at variable rates to said engine, a turbine of centripetal type, a compressor having a rotary bladed impeller driven solely by said turbine throughout a wide range of engine operating conditions, means for leading exhaust gases from said engine to said turbine to drive the latter, means for leading air delivered from said compressor to said engine to support combustion of the fuel in the engine, means for varying the whirl component, in the direction of rotation of the impeller, of the air approaching the impeller blades, and means for controlling said whirl varying means and supply of fuel to effect concurrent decrease of said whirl component and increase of rate of fuel supply and vice versa, thereby to maintain high speed of the turbine-compressor combination through said wide range of engine operating conditions, the inlet annulus of the impeller having radial dimensions such that the mean square value of the inner and outer diameters of the annulus is approximately in the range of 55% to 60% of the discharge diameter of the impeller, and in which the radial extent of the blade at the inlet is no more than 30% of the mean inlet diameter.

10. In a turbocharged engine power plant,
an internal combustion engine,
means for supplying fuel to said engine,
a turbine of centripetal type,
a compressor having a rotary bladed impeller driven solely by said turbine throughout a wide range of engine operating conditions,
means for leading exhaust gases from said engine to said turbine to drive the latter,
means for leading air delivered from said compressor to said engine to support combustion of the fuel in the engine,
means for varying the whirl component, in the direction of rotation of said impeller, of the air approaching the impeller blades, and
means for controlling said whirl varying means and speed of the engine to effect concurrent decrease of said whirl component and increase of engine speed and vice versa,
thereby to maintain high speed of the turbine-compressor combination through said wide range of engine operating conditions.

References Cited in the file of this patent

UNITED STATES PATENTS

| | | |
|---|---|---|
| 1,959,703 | Birmann | May 22, 1934 |
| 1,989,413 | Hagen | Jan. 29, 1935 |
| 2,456,488 | Brown | Dec. 14, 1948 |
| 2,456,930 | Lancey | Dec. 21, 1948 |
| 2,462,796 | Wheeler | Feb. 22, 1949 |
| 2,622,391 | Lindeman | Dec. 23, 1952 |
| 2,656,675 | Coar | Oct. 27, 1953 |
| 2,777,632 | Kishline et al. | Jan. 15, 1957 |
| 2,792,197 | Wood | May 14, 1957 |
| 2,827,261 | Parker et al. | Mar. 18, 1958 |
| 2,836,347 | Barr et al. | May 27, 1958 |
| 2,860,827 | Egli | Nov. 18, 1958 |
| 2,876,946 | Hornschuch | Mar. 10, 1959 |
| 2,888,799 | Buchi | June 2, 1959 |
| 2,949,735 | Stefucza | Aug. 23, 1960 |

OTHER REFERENCES

Serial No. 344,165, A. Baj. (A.P.C.), published May 25, 1943.